(12) United States Patent
Weickert

(10) Patent No.: US 11,320,812 B2
(45) Date of Patent: May 3, 2022

(54) METHOD FOR DETERMINING THE GEOMETRY OF A RAW PART, WHICH IS SHAPED TO FORM A FINISHED PART IN A HYDROEROSIVE GRINDING METHOD

(71) Applicant: BASF SE, Ludwigshafen am Rhein (DE)

(72) Inventor: Matthias Weickert, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 15/734,220

(22) PCT Filed: May 21, 2019

(86) PCT No.: PCT/EP2019/063038
§ 371 (c)(1),
(2) Date: Dec. 1, 2020

(87) PCT Pub. No.: WO2019/228847
PCT Pub. Date: Dec. 5, 2019

(65) Prior Publication Data
US 2021/0208575 A1    Jul. 8, 2021

(30) Foreign Application Priority Data

Jun. 1, 2018  (EP) ..................................... 18175534

(51) Int. Cl.
*G05B 19/418* (2006.01)
*B24C 3/32* (2006.01)

(52) U.S. Cl.
CPC ........ *G05B 19/41885* (2013.01); *B24C 3/327* (2013.01); *G05B 19/4187* (2013.01); *G05B 19/41815* (2013.01)

(58) Field of Classification Search
None
See application file for complete search history.

(56) References Cited

U.S. PATENT DOCUMENTS

| 2003/0115026 A1 | 6/2003 | Kuzumaki et al. |
| 2005/0033471 A1 | 2/2005 | Ohmori et al. |

(Continued)

FOREIGN PATENT DOCUMENTS

| JP | 06-315849 A | 11/1994 |
| WO | 2014/000954 A1 | 1/2014 |

OTHER PUBLICATIONS

P. A. Rizkalla: "Development of a Hydroerosion Model using a Semi-Empirical Method Coupled with an Euler-Euler Approach", Jan. 1, 2011, pp. 1-277, XP055522729.

(Continued)

*Primary Examiner* — Carlos R Ortiz Rodriguez
(74) *Attorney, Agent, or Firm* — Faegre Drinker Biddle & Reath LLP

(57) ABSTRACT

The invention relates to a method for determining the geometry of a raw part, which is shaped to form a finished part in a hydroerosive grinding method, comprising the following steps: (a) creation of a structural model of the finished part to be produced, the structural model of the finished part to be produced being used as an initial model for the first execution of the next step (b); (b) mathematical simulation of the hydroerosive grinding method, with which an intermediate model with a modified geometry is produced starting from an initial model; (c) comparison of the intermediate model produced in step (b) with the structural model of the finished part and determination of the distance, orthogonal to the surface of the structural model of the finished part, between the structural model of the finished part to be produced and the intermediate model at each node of the structural model, and comparison of the orthogonal distance with a predetermined limit value; (d) creation of a modified model of the component by adding from 5 to 99% of the distance determined in step (c) with the opposite sign at each node on the surface of the model which is used as an (Continued)

initial model in step (b), orthogonally to the surface, and repetition of steps (b) to (d), the modified model created in step (d) being used as a new initial model in step (b) if the orthogonal distance determined in step (c) at at least one node is greater than the predetermined limit value; (e) termination of the simulation when the orthogonal distance determined in step (c) between the structural model of the finished part and the intermediate model at each node falls below a predetermined limit value, the initial model of the step (b) carried out last corresponding to the raw part geometry to be determined.

7 Claims, 1 Drawing Sheet

(56) References Cited

U.S. PATENT DOCUMENTS

2010/0185312 A1   7/2010   Wang et al.
2013/0060368 A1   3/2013   Balkenende et al.
2017/0065380 A1   3/2017   Leeson et al.

OTHER PUBLICATIONS

International Preliminary Report on Patentability received for PCT Patent Application No. PCT/EP2019/063038, dated Dec. 10, 2020, 7 pages.

International Search Report and Written Opinion received for PCT Patent Application No. PCT/EP2019/063038, dated Aug. 12, 2019, 9 pages.

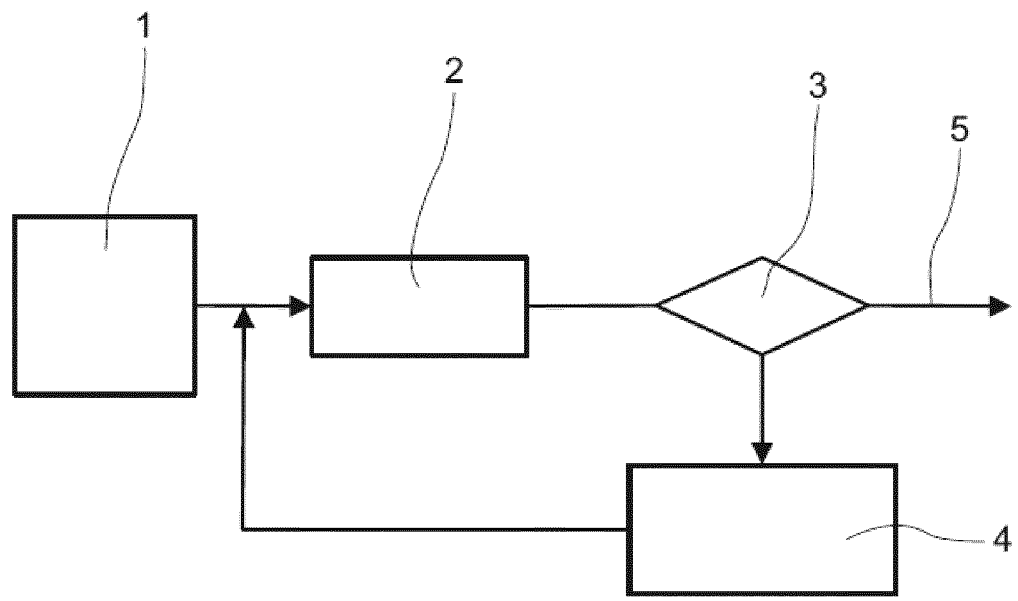

METHOD FOR DETERMINING THE GEOMETRY OF A RAW PART, WHICH IS SHAPED TO FORM A FINISHED PART IN A HYDROEROSIVE GRINDING METHOD

CROSS-REFERENCE TO RELATED APPLICATIONS

This application is a national stage application (under 35 U.S.C. § 371) of PCT/EP2019/063038, filed May 21, 2019, which claims benefit of European Application No. 18175534.9, filed Jun. 1, 2018, both of which are incorporated herein by reference in their entirety.

The invention relates to a method for determining the geometry of a raw part, which is shaped to form a finished part in a hydroerosive grinding method.

Hydroerosive grinding methods are processing methods, in which a liquid containing grinding particles flows over a surface to be processed. During the flow, the grinding particles contained in the liquid strike the surface of the component to be processed, so that the corresponding surface is erosively ground by the grinding particles eroding material from the component upon impact. Depending on the geometry, in particular the shape and the size distribution of the grinding particles, very fine processing of the surfaces, and in particular also treatment of very fine structures, are in this case possible. Hydroerosive grinding methods may, for example, be used for treating the surfaces of 3D-printed components made of metal, ceramic and/or plastic, which have a surface roughness of between 50 and 500 µm. These surface roughnesses lead to undesired effects when using the corresponding components, for example fouling or increased pressure loss. In order to be able to comply with the exact geometry within the error tolerances after the grinding method, the geometry of the component must optionally already need to be modified during the production method, particularly in the case of production by a 3D printing method, and it must be possible to adjust the grinding method precisely and in a controlled way.

From WO 2014/000954 A1, it is for example known to round bores on injection nozzles in injection valves for internal combustion engines by a hydroerosive method, so that sharp-edged transitions can in this way be ground and rounded on the very small bores through which the fuel is injected at high pressure into the internal combustion engine. For the method, a liquid containing grinding particles flows through the injection nozzle. For uniform flow through the bore of the injection nozzle, and therefore uniform rounding of the edges, a hollow body is introduced into the injection valve and the liquid containing grinding particles is guided through the inner flow channel formed in the hollow body and an outer flow channel formed between the hollow body and the inner wall of the injection valve. In this case, for a uniform result, it is possible to use different liquids containing grinding particles, which flow through the inner and outer flow channels, and/or the liquid containing grinding particles may be delivered through the inner and the outer flow channels with different flow rates or pressures.

A mathematical simulation of the hydroerosive grinding is described, for example, in P.A. Rizkalla, Development of a Hydroerosion Model using a Semi-Empirical Method Coupled with an Euler-Euler Approach, Dissertation, Royal Melbourne Institute of Technology, University of Melbourne, November 2007, pages 36 to 44. Although this describes the way in which the surface is modified by the grinding, it is, however, not possible to deduce therefrom the way in which a raw part must be shaped so that a finished part with the desired dimensions is formed from the raw part after the grinding.

The document JP H06 315849 A discloses a method to provide high-precision polishing by measuring the shape of an object to be polished, calculating necessary polishing quantities at various points of the polishing face from the measured result, calculating the required number of times for polishing, and judging the surface shape of the object assumed under the polishing in the optimum polishing locus. The method aims at reducing the effort needed in conventional polishing processes which results from iterating the steps of polishing the object and measuring the result of the polishing step until a final desired form of the polished object is obtained. However, the method proposed in this document is limited by the given raw form of the object to be polished and the process parameters of the selected polishing apparatus and tool.

The object of the present invention is therefore to provide a method with which the geometry of a raw part, which is shaped to form a finished part in a hydroerosive grinding method, can be determined in such a way that the finished part produced by the hydroerosive grinding method has the required geometry within a predetermined tolerance.

This object is achieved by a method for determining the geometry of a raw part, which is shaped to form a finished part in a hydroerosive grinding method, comprising the following steps:

(a) creation of a structural model of the finished part to be produced, the structural model of the finished part to be produced being used as an initial model for the first execution of the next step (b);

(b) mathematical simulation of the hydroerosive grinding method, with which an intermediate model with a modified geometry is produced starting from an initial model;

(c) comparison of the intermediate model produced in step (b) with the structural model of the finished part and determination of the distance, orthogonal to the surface of the structural model of the finished part, between the structural model of the finished part to be produced and the intermediate model at each node of the structural model, and comparison of the orthogonal distance with a predetermined limit value;

(d) creation of a modified model of the component by adding from 5 to 99% of the distance determined in step (c) with the opposite sign at each node on the surface of the model which is used as an initial model in step (b), orthogonally to the surface, and repetition of steps (b) to (d), the modified model created in step (d) being used as a new initial model in step (b) if the orthogonal distance determined in step (c) at at least one node is greater than the predetermined limit value;

(e) termination of the simulation when the orthogonal distance determined in step (c) between the structural model of the finished part and the intermediate model at each node falls below a predetermined limit value, the initial model of the step (b) carried out last corresponding to the raw part geometry to be determined.

By this method, it is possible to determine, within a predetermined tolerance for the finished part, the geometry which a raw part must have so that the desired shaped part is formed during the hydroerosive grinding method carried out.

In order to generate the structural model of the finished part to be produced, a three-dimensional image of the desired finished part is preferably initially generated with any desired computer-aided design program (CAD program). During the creation of the three-dimensional image of the desired finished part, it is necessary to take care that it reflects the desired finished part exactly true to scale. The image created in this way is subsequently transferred into the structural model. For the structural model, a grid is placed over the image of the finished part. In this case, it is necessary to take care that the individual nodes of the grid, i.e. the points at which at least two grid lines touch at an angle not equal to 180°, are selected in such a way that the structural model still reflects the desired finished part with sufficient precision. Particularly on small structures, for example small radii or curvatures, the distance between two nodes must be small enough to still describe the geometry accurately. Since, at positions of the component at which the flow of the liquid containing the grinding particles is perturbed, for example at elevations or depressions on the surface, the flow modified in this way leads to a modified effect of the grinding particles on the surface, the distance between the individual nodes should also be selected to be sufficiently small at such positions. The distance to be selected between the nodes is in this case dependent on the size of the component to be processed and the required dimensional tolerances of the finished part. The greater the dimensional tolerances are, the greater the distance between two nodes can be selected to be. With an increasing distance from the surface to be processed, the distance between two nodes may likewise be increased. If a simulation program which also makes it possible to generate an image of the finished part is used for the calculation in step (b), the same program may of course be used for creating the image and for generating the structural model from the image.

The way in which a suitable structural model is constructed is known to the person skilled in the art, wherein conventional simulation programs, which in general also comprise modules for generating the structural model, may be used for creating the structural model. Depending on the desired calculation method in step (b), it is possible to use simulation programs which operate with finite differences, finite elements or finite volumes. Conventional and preferred is the use of simulation programs based on finite elements, such as those that are available for example from ANSYS®.

In step (b), starting from an initial model, the hydroerosive grinding method is mathematically simulated, an intermediate model being generated by the mathematical simulation. For the mathematical simulation of the hydroerosive grinding method, on the one hand the flow of the liquid containing the grinding particles is mathematically simulated, and on the other hand the transport of the grinding particles in the liquid, and in connection with this the impact of the grinding particles on the component to be processed and the material erosion resulting therefrom. For the calculation, commercially available simulation programs may be used. One possible model for the hydroerosive grinding method is described, for example, in P.A. Rizkalla, Development of a Hydroerosion Model using a Semi-Empirical Method Coupled with an Euler-Euler Approach, Dissertation, Royal Melbourne Institute of Technology, University of Melbourne, November 2007, pages 36 to 44. Besides the mathematical simulation described here, however, it is also possible to use any other mathematical simulation, known to the person skilled in the art, of the grinding method, with which the erosion and form of the erosion of material from a surface by the grinding particles contained in the liquid is described.

As already described above, the mathematical simulation may be carried out with a finite difference method, a finite element method or a finite volume method, commercial simulation programs generally using finite element methods.

Process data which correspond to the intended subsequent production process are preferably used as boundary conditions and substance data for the mathematical simulation. The substance data which are used for the mathematical simulation should also correspond to those of the intended subsequent production method. For example, pressure, temperature and volume flow rate of the liquid containing the grinding particles which is used are used as boundary conditions for the mathematical simulation of the hydroerosive grinding method. Substance data, which are used for the mathematical simulation, of the liquid containing the grinding particles, are for example the viscosity of the liquid and the density of the liquid, and further substance data are the shape, size and material of the grinding particles as well as the amount of grinding particles in the liquid. Further process data are the geometrical shape of the component, which shape is used as a structural model, as well as the geometrical shape of channels through which the liquid containing the grinding particles is transported. A further process quantity which is used for the mathematical simulation is the duration of the grinding method.

If it is planned to modify the process conditions while carrying out the hydroerosive grinding method, for example the pressure or the temperature of the liquid containing the grinding particles, or in particular the volume flow rate of the liquid containing the grinding particles, these variations of the process conditions are also correspondingly taken into account in the mathematical simulation of the grinding method. Besides the variations of the volume flow rate and of the pressure, the variations of the process conditions also relate to variations of the geometry during the grinding method.

If, with the flow of the liquid containing the grinding particles in one flow direction over the surfaces to be processed, it is not possible to reach all positions to be processed on the surface, it is possible to reposition the component in such a way that the liquid containing the grinding particles flows over it in another direction, or to reverse the flow direction of the liquid containing the grinding particles so that it flows in the opposite direction over the surface to be processed. This variation of the flow direction of the liquid containing the grinding particles is likewise a variation of the process conditions which is to be taken into account in the mathematical simulation of the grinding method.

As a result of the mathematical simulation of the hydroerosive grinding method in step (b), the intermediate model has a geometry that corresponds to the geometry which is formed when the initial model is subjected to the hydroerosive grinding method. Since the structural model of the finished part is used as an initial model when carrying out step (b) for the first time, the intermediate model determined when carrying out step (b) for the first time has a shape in which the processed surface has been modified in such a way that the intermediate model generated reflects a component of which the surfaces have been ground starting from the finished part. The intermediate model thus has a geometry which differs from the desired geometry of the finished part essentially exactly in the opposite way to the shape which is required as an initial model, in order to obtain the desired finished part at the end of the grinding process.

In order to approximate the shape of the raw part which is required in order to obtain the desired finished part within the required tolerances, in step (c) the intermediate model generated in step (b) is compared with the structural model of the finished part, and the distance, orthogonal to the surface of the structural model of the finished part, between the structural model of the finished part to be produced and the intermediate model is determined at each node of the structural model. This orthogonal distance determined in each node is compared with a predetermined limit value. The predetermined limit value is in this case preferably the dimensional tolerance of the finished part.

If the orthogonal distance between the structural model of the finished part and the intermediate model determined in step (b) is greater than the predetermined limit value at at least one node, step (d) is carried out, and if the orthogonal distance between the structural model of the finished part and the intermediate model determined in step (b) is less than the predetermined limit value in all nodes, step (e) is carried out and the method is ended.

In step (d), a modified model of the component is created by adding from 5 to 99% of the distance determined in step (c), preferably from 30 to 70% of the orthogonal distance determined in step (c), and in particular from 40 to 60%, for example 50%, of the distance determined in step (c) with the opposite sign at each node on the surface of the model which is used as an initial model in step (b), orthogonally to the surface of the initial model. Subsequently, steps (b) to (d) are repeated, the modified model created in step (d) being used as a new initial model in step (b). The fact that from 5 to 99%, preferably from 30 to 70%, in particular from 40 to 60%, for example 50% of the orthogonal distance determined in step (c), rather than the entire orthogonal distance determined in step (c) is added to the initial model used in step (b) ensures that the method converges and in all cases a geometry is found for the raw part from which the finished part is produced in the hydroerosive grinding method.

As a result of the comparison of the intermediate model generated in step (b) with the structural module of the finished part in step (c), in each execution the orthogonal distance which still leads to a deviation of the initial model from the finished part is registered. By adding a part of this orthogonal distance to the initial model in step (b) in order to create a new initial model for the subsequent execution of steps (b) to (d), in each execution the shape of the required raw part is approximated more closely. This iterative method leads to the required shape of the raw part in order to produce the finished part by a hydroerosive grinding method, as soon as the intermediate model generated in step (b) has in each node an orthogonal distance from the structural model of the finished part which is less than the predetermined limit value. The shape of the raw part is in this case reflected by the initial model in step (b), in which the model whose surface corresponds to the finished part within the predetermined tolerances, i.e. within the predetermined limit values, is generated as an intermediate model.

Depending on the finished part to be created, the required tolerances, and therefore the predetermined limit values, may be equal over the entire surface to be processed of the finished part to be produced. It is, however, also possible to specify different tolerances for different surfaces or different regions of the surface of the finished part, so that different limit values for the orthogonal distance between the intermediate model from step (b) and the structural model of the finished part are then also obtained.

By the hydroerosive grinding method, both surfaces inside a component, for example bores, or also outer surfaces, i.e. faces on the outside of the component, can be processed. In the case of surfaces inside the component, the component is preferably connected by the inlet and the outlet of the bore to a line through which the liquid containing the grinding particles flows. In this way, the liquid containing grinding particles is guided only through the bore to be processed and does not flow over the outer surfaces, so that the latter is not modified by the liquid containing grinding particles.

If outer surfaces are intended to be processed by the hydroerosive grinding method, the component is placed in a channel through which the liquid containing grinding particles flows. In this case, the liquid can flow over the outer surfaces. For the mathematical simulation in this case the channel also has to be taken into account in the simulation. For the case in which inner and outer surfaces of the component are intended to be processed by the hydroerosive grinding method, it is possible either to process them in one working step, by placing the component in the channel, or alternatively in two steps, by first flowing over the inner surfaces, closing the openings in the component, and then placing the component in the channel in order to process the outer surfaces. Of course, the processing may also be carried out in a different sequence, for example by processing the outer surfaces first and then the inner surfaces. The mathematical simulation is in each case carried out in the way in which the hydroerosive grinding method is intended to be carried out.

It is particularly advantageous for the geometry of the raw part determined by the mathematical simulation, which is intended to be processed by the hydroerosive grinding method to form the finished part, to be used as a specification in CNC-aided production processes for the raw part or for tools for production of the raw part. As an alternative, the geometry of the raw part determined by the mathematical simulation, may also be used for an additive production method such as 3D printing.

Tools for production of the raw part are, for example, used when the raw part cannot be produced by a machining production method, but is for example produced by a casting method. All possible materials, for example metals, plastics or even ceramics, may be processed by the hydroerosive grinding method. Depending on the material to be processed, a suitable material, a suitable shape and a suitable size are selected for the grinding particles. Likewise selected according to the material of the raw part to be processed are the proportion of grinding particles in the liquid, the liquid and the pressure, the temperature and the volume flow rate of the liquid, as well as the duration of the grinding method.

The method for determining the geometry of the raw part may be carried out repeatedly with different process conditions or substance data. In this way, the method may be used not only to determine the geometry of the raw part but also to determine the most suitable process conditions and grinding particles, in which case, for a constant shape of the finished part, the modified process conditions and grinding particles may also lead to a different geometry for the raw part.

Because of the complexity of the mathematical simulation, the method for determining the geometry of a raw part is preferably carried out on a programmable computer unit, in particular a computer or a tablet, in which case the computer unit must be configured in such a way that data can be entered, for example via a keyboard or a touchscreen. To this end, a computer program is used, by which the method is carried out when the computer program runs on the programmable computer unit. The computer program may be stored on a machine-readable storage medium, for instance on a permanent or rewritable storage medium, or in association with a computer device or on a removable CD-ROM, DVD, Blu-Ray disc or a USB stick. In addition or as an alternative, the computer program may be provided on a computer device, for example on a server, for downloading, for example via a data network such as the Internet or a communication connection, for instance a telephone line or a wireless connection.

The method is represented by way of example in the FIGURE and will be explained in more detail with the aid of the description below.

The single FIGURE shows a flowchart of the method according to the invention.

In a first step 1, a three-dimensional image of a desired component is created. Preferably, the creation of the three-dimensional image is carried out with the aid of a computer-aided graphics program, conventionally a CAD program. With the aid of a suitable program, a structural model is generated from the three-dimensional image. The structural model may in this case be generated on the basis of a rectangular grid or a triangular grid, any other grid shape having polygonal units, for example pentagonal, hexagonal or octagonal grid elements, also being possible. A combination of grid elements with different numbers of vertices is also possible. It is, however, preferable to use a rectangular grid or a triangular grid.

The generation of the structural model of the desired component is followed by a second step 2, in which, starting from an initial model, the hydroerosive grinding method is simulated so that an intermediate model is generated, the geometry of which corresponds to the geometry which the initial model used for the simulation has after the hydroerosive grinding process.

The hydroerosive grinding process is in this case simulated with the process conditions which are intended then to be used in the hydroerosive grinding process used for production of the component.

The first time step 2 is carried out, the structural model of the desired component, as generated in step 1, is used as an initial model for the mathematical simulation.

In a third step 3, the intermediate model generated in step 2 is compared with the structural model of the desired component. To this end, at each node of the structural model of the desired component, the orthogonal distance to the surface, as calculated in the mathematical simulation, of the intermediate model is determined and compared with a predetermined limit value. The predetermined limit value is in this case preferably the dimensional tolerance of the desired component.

If the orthogonal distance at at least one node is greater than the predetermined limit value, a fourth step 4 is carried out, in which from 5 to 99%, preferably from 30 to 70%, in particular from 40 to 60%, and more particularly preferably 50%, of the orthogonal distance to the surface of the initial model used for the mathematical simulation in step 2 is added with the opposite sign. This means that, for the case in which the distances of the surface components calculated in the intermediate model, which lie below the surface of the desired component, are added onto the surface of the initial model so that the surface of the initial model is raised, while distances of the surface components calculated in the intermediate model, which lie above the surface of the desired component, are subtracted from the surface of the initial model, so that the surface of the initial model is lowered. In this way, a modified model is generated. With this modified model as an initial model, steps 2 and 3 are then carried out again. If, during the comparison in step 3, the orthogonal distance at at least one node is again greater than the predetermined limit value, steps 4, 2 and 3 are repeated again. This procedure is repeated until, in step 3, the orthogonal distance between the structural model of the desired component and the intermediate model as calculated in step 2 is less than the predetermined limit value at each node.

As soon as the orthogonal distance is less than the predetermined limit value at each node, the method is terminated. This is denoted by the reference numeral five. The initial model used for this last execution of step 2 then corresponds to the geometry of the raw part, which is used in the hydroerosive grinding method in order to obtain the desired component.

Preferably, a three-dimensional image, in particular a CAD representation, is generated from the initial model which corresponds to the raw part to be used in the hydroerosive grinding method. This three-dimensional image may then, for example, be used as an input file for a CNC process for production of the raw part, or also for production of a tool in which the raw part is produced.

As already described above, the production of the raw part is carried out by means of a CNC method, in particular when machining methods are used, and production of a tool when the raw part is intended to be cast.

Besides the production method mentioned above, however, as an alternative it is also possible to produce the raw part by an additive production method, for example by a 3D printing method.

The invention claimed is:

1. A method for determining the geometry of a raw part, which is shaped to form a finished part in a hydroerosive grinding method, comprising the following steps:
    (a) creation of a structural model of the finished part to be produced, the structural model of the finished part to be produced being used as an initial model for the first execution of the next step (b);
    (b) mathematical simulation of the hydroerosive grinding method, with which an intermediate model with a modified geometry is produced starting from an initial model;
    (c) comparison of the intermediate model produced in step (b) with the structural model of the finished part and determination of the distance, orthogonal to the surface of the structural model of the finished part, between the structural model of the finished part to be produced and the intermediate model at each node of the structural model, and comparison of the orthogonal distance with a predetermined limit value;
    (d) creation of a modified model of the component by adding from 5 to 99% of the distance determined in step (c) with the opposite sign at each node on the surface of the model which is used as an initial model in step (b), orthogonally to the surface, and repetition of steps (b) to (d), the modified model created in step (d) being used as a new initial model in step (b) if the orthogonal distance determined in step (c) at at least one node is greater than the predetermined limit value;
    (e) termination of the simulation when the orthogonal distance determined in step (c) between the structural model of the finished part and the intermediate model at each node falls below a predetermined limit value, the initial model of the step (b) carried out last corresponding to the raw part geometry to be determined.

2. The method as claimed in claim 1, wherein the mathematical simulation (b) is carried out with a finite difference method, a finite element method or a finite volume method.

3. The method as claimed in claim 1, wherein process data which correspond to the intended subsequent production process are used as boundary conditions and substance data for the mathematical simulation in step (b).

4. The method as claimed in claim 3, wherein the process data comprise the volume flow rate, substance data of the liquid containing grinding particles which is used, shape, size and material of the grinding particles used, geometrical data, pressure and temperature of the liquid containing grinding particles and duration of the hydroerosive grinding method.

5. The method as claimed in claim 3, wherein variations, intended in the hydroerosive grinding method, of process conditions are also taken into account in the mathematical simulation of the grinding method.

6. The method as claimed in claim 5, wherein variations of the process conditions comprise variations of the volume flow rate and variations of the pressure, as well as variations of the geometry over the duration of the grinding method.

7. The method as claimed in claim 1, wherein the geometry of the raw part determined in step (e) is used as a specification in CNC-aided production processes for the raw part, or for tools for production of the raw part.

\* \* \* \* \*